(12) United States Patent
Cheong et al.

(10) Patent No.: US 12,482,853 B2
(45) Date of Patent: Nov. 25, 2025

(54) NEGATIVE ELECTRODE FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Junyoung Cheong, Yongin-si (KR); Sungsu Kim, Yongin-si (KR); Jungkun Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 569 days.

(21) Appl. No.: 17/660,004

(22) Filed: Apr. 20, 2022

(65) Prior Publication Data

US 2022/0352543 A1 Nov. 3, 2022

(30) Foreign Application Priority Data

Apr. 23, 2021 (KR) .......................... 10-2021-0053157

(51) Int. Cl.
*H01M 10/0525* (2010.01)
*H01M 4/02* (2006.01)
(Continued)

(52) U.S. Cl.
CPC ..... *H01M 10/0525* (2013.01); *H01M 4/0404* (2013.01); *H01M 4/366* (2013.01); *H01M 2004/021* (2013.01); *H01M 2004/027* (2013.01)

(58) Field of Classification Search
None
See application file for complete search history.

(56) References Cited

U.S. PATENT DOCUMENTS 7,662,513 B2    2/2010   Choi et al.
2004/0072076 A1  4/2004   Matsubara et al.
(Continued)

FOREIGN PATENT DOCUMENTS

CN   108023064 A   5/2018
CN   108807844 A   11/2018
(Continued)

OTHER PUBLICATIONS

KR20220131613 (Year: 2022).*
(Continued)

*Primary Examiner* — Brian R Ohara
(74) *Attorney, Agent, or Firm* — Womble Bond Dickinson (US) LLP

(57) ABSTRACT

A negative electrode for a rechargeable lithium battery and a rechargeable lithium battery including the same are provided. The negative electrode includes: a current collector; a first negative active material layer on the current collector and including a first negative active material; and a second negative active material layer on the first negative active material layer and including a second negative active material, wherein the first negative active material layer and the second negative active material layer have a peak intensity ratio ($I_{(002)}/I_{(110)}$) of a peak intensity at a (002) plane relative to a peak intensity at a (110) plane of 150 or less when measured by X-ray powder diffraction (XRD) using a CuKα ray.

12 Claims, 11 Drawing Sheets

Comparative Example 1

Example 1

(51) Int. Cl.
  *H01M 4/04* (2006.01)
  *H01M 4/36* (2006.01)

(56) References Cited

U.S. PATENT DOCUMENTS

| | | |
|---|---|---|
| 2013/0260217 A1 | 10/2013 | Matsui et al. |
| 2018/0123120 A1 | 5/2018 | Lee et al. |
| 2018/0159118 A1 | 6/2018 | Lee et al. |
| 2018/0315985 A1* | 11/2018 | Torita ............... H01M 10/0525 |
| 2019/0326598 A1 | 10/2019 | Lee et al. |
| 2019/0334161 A1 | 10/2019 | Lee et al. |
| 2020/0381735 A1 | 12/2020 | Oh et al. |
| 2022/0209217 A1 | 6/2022 | Lee et al. |
| 2022/0263063 A1 | 8/2022 | Lee et al. |

FOREIGN PATENT DOCUMENTS

| | | |
|---|---|---|
| CN | 110391395 A | 10/2019 |
| CN | 110416551 A | 11/2019 |
| JP | 2003-297353 A | 10/2003 |
| JP | 2013-211228 A | 10/2013 |
| JP | 2013-214460 A | 10/2013 |
| JP | 2015-138644 A | 7/2015 |
| JP | 2018-190575 A | 11/2018 |
| KR | 10-0445438 B1 | 8/2004 |
| KR | 10-2016-0166096 A | 6/2018 |
| KR | 10-1874150 B1 | 7/2018 |
| KR | 10-1972235 B1 | 8/2019 |
| KR | 10-2020-0124513 A | 11/2020 |
| KR | 10-2020-0124514 A | 11/2020 |
| WO | 2020/218780 A1 | 10/2020 |
| WO | WO 2020/218773 A1 | 10/2020 |

OTHER PUBLICATIONS

European Search Report dated Oct. 6, 2022 for corresponding European Application No. 22169472.2, 7pp.
Decision of Rejection dated Nov. 6, 2023, of the corresponding Japanese Patent Application No. 2022-071475, 6 pages.
Office Action dated Apr. 10, 2024 for corresponding European Patent Application No. 22169472.2, 4pp.
Chinese Office Action for CN Application No. 202210430096.X, dated Feb. 14, 2025, 7 pp.
Chinese Notice of Allowance for CN Application No. 202210430096.X dated Oct. 20, 2025, with English translation, 8 pages.

* cited by examiner

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2021-0053157 filed in the Korean Intellectual Property Office on Apr. 23, 2021, the entire contents of which are hereby incorporated by reference.

BACKGROUND

1. Field

Embodiments of the present disclosure relate to a negative electrode for a rechargeable lithium battery and a rechargeable lithium battery including the negative electrode.

2. Description of the Related Art

A rechargeable lithium battery has recently drawn attention as a power source for small portable electronic devices. Rechargeable lithium batteries utilize an organic electrolyte solution and thereby have twice or more a discharge voltage as other batteries using an alkali aqueous solution, and accordingly, have high energy density.

As for positive active materials of a rechargeable lithium battery, oxides including lithium and a transition metal having a structure capable of intercalating/deintercalating lithium ions, such as $LiCoO_2$, $LiMn_2O_4$, $LiNi_{1-x}Co_xO_2$ ($0<x<1$), and the like has been mainly used.

As for negative active materials, various suitable carbon-based materials capable of intercalating/deintercalating lithium ions such as artificial graphite, natural graphite, hard carbon, and the like have been used, and recently, a non-carbon-based negative active material such as silicon or tin has been researched in order to obtain high capacity.

The above information disclosed in this Background section is only for enhancement of understanding of the background of the present disclosure, and therefore, it may contain information that does not form the prior art that is already known in this country to a person of ordinary skill in the art.

SUMMARY

One embodiment provides a negative electrode for a rechargeable lithium battery exhibiting reduced electrical resistance and good cycle-life characteristics.

Another embodiment provides a rechargeable lithium battery including the negative electrode.

One embodiment provides a negative electrode for a rechargeable lithium battery including: a current collector; a first negative active material layer on the current collector and including a first negative active material; and a second negative active material layer on the first negative active material layer and including a second negative active material, wherein the first negative active material layer and the second negative active material layer have a peak intensity ratio ($I_{(002)}/I_{(110)}$) of a peak intensity at a (002) plane relative to a peak intensity at a (110) plane of 150 or less when measured by X-ray powder diffraction (XRD) using a CuKα ray.

The peak intensity ratio ($I_{(002)}/I_{(110)}$) may be about 1 to about 150.

The peak intensity ratio ($I_{(002)}/I_{(110)}$) may be obtained after coating a composition for the first negative active material layer and a composition for the second negative active material layer on the current collector to prepare a first layer and a second layer, applying a magnetic field to the resulting product, and drying and compressing to prepare the first negative active material layer and the second negative active material layer.

In one embodiment, the peak intensity ratio ($I_{(002)}/I_{(110)}$) may be obtained after coating a composition for the first negative active material layer on the current collector to form a first layer, coating a composition for the second negative active material layer on the first layer to form a second layer, applying a magnetic field to the resulting product, and drying and compressing to prepare the first negative active material layer and the second negative active material layer.

The first negative active material layer and the second negative active material layer may be oriented layers in which the first negative active material and the second negative active material are oriented to the current collector.

The peak intensity ratio ($I_{(002)}/I_{(110)}$) of the peak intensity at the (002) plane relative to the peak intensity at the (110) plane of the first negative active material layer and the second negative active material layer when measured by XRD using a CuKα ray, may correspond to about 90% or less of a peak intensity ratio ($I_{(002)}/I_{(110)}$) of non-oriented layers which have the same (or substantially the same) compositions and thickness as the first negative active material layer and the second negative active material layer.

A ratio of a peel strength of the first negative active material layer to that of the second negative active material layer may be about 70% to about 90%.

The first negative active material and the second negative active material may be the same as or different from each other, and may be crystalline carbon-based materials. The crystalline carbon-based material may be artificial graphite, natural graphite, or a combination thereof.

The first negative active material and the second negative active material may further comprise at least one selected from a Si-based negative active material, a Sn-based negative active material, or a lithium vanadium oxide negative active material.

The first negative active material layer may have a thickness of about 20 μm to about 125 μm, and the second negative active material layer may have a thickness of about 20 μm to about 125 μm.

The peak intensity ratio may be a peak integral area value obtained from a peak integral area intensity value at the (002) plane/a peak integral area intensity value at the (110) plane.

Another embodiment provides a rechargeable lithium battery including: the negative electrode; a positive electrode including a positive active material; and an electrolyte.

Other embodiments are included in the following detailed description.

The negative electrode for the rechargeable lithium battery may exhibit reduced electrical resistance and an excellent cycle-life characteristic.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
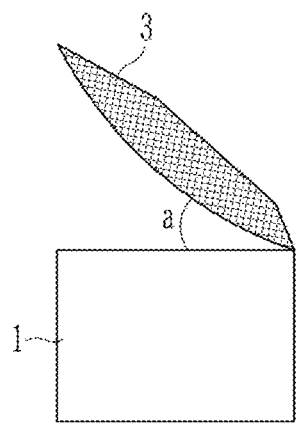
FIG. 1 is a schematic view showing orientation of a negative active material with respect to a current collector according to an embodiment of the present disclosure.

Hereinafter, embodiments of the present disclosure are described in more detail. However, these embodiments are examples, the present disclosure is not limited thereto, and, instead, the scope of the present disclosure is defined by the scope of the appended claims, and equivalents thereof.

A negative electrode for a rechargeable lithium battery according to one embodiment includes: a current collector; a first negative active material layer on the current collector and including a first negative active material; and a second negative active material layer on the first negative active material layer and including a second negative active material. The first negative active material layer and the second negative active material layer may have a peak intensity ratio ($I_{(002)}/I_{(110)}$) of a peak intensity at a (002) plane relative to a peak intensity at a (110) plane of 150 or less when measured by X-ray powder diffraction (XRD) using a CuKα ray. In one embodiment, the peak intensity ratio ($I_{(002)}/I_{(110)}$) may be about 1 to about 150.

Generally, as described herein, the peak intensity ratio indicates a height of a peak or an integral area of a peak. In some embodiments, the peak intensity indicates the integral area of a peak. Furthermore, the value (the peak intensity ratio) is maintained after charging and discharging a rechargeable lithium battery including the negative active material.

The peak intensity ratio may be a value obtained after concurrently (e.g., simultaneously) coating a composition for preparing a first negative active material layer and a composition for preparing a second negative active material layer on a current collector to form a first layer and a second layer on the first layer, applying a magnetic field to the resulting product, and drying and compressing to prepare the first negative active material layer and the second negative active material layer.

In one embodiment, the peak intensity ratio may also or alternatively be a value obtained after coating a composition for preparing a first negative active material layer on a current collector to form a first layer, coating a composition for preparing a second negative active material layer on the first layer to form a second layer, applying a magnetic field to the resulting product, and drying and compressing to prepare the first negative active material layer and the second negative active material layer.

In some embodiments, the first negative active material layer and the second negative active material layer may be oriented layers and may each have a peak intensity ratio ($I_{(002)}/I_{(110)}$) of about 150 or less, or about 1 to about 150, after compressing (e.g., the first negative active material layer and the second negative active material layer may each have the peak intensity ratio ($I_{(002)}/I_{(110)}$) of about 150 or less). Having the peak intensity ratio ($I_{(002)}/I_{(110)}$) of about 150 or less, shortens a distance for transferring lithium ions in the first negative active material layer and the second negative active material layer and reduces ion resistance of the first negative active material layer and the second negative active material layer.

Furthermore, a peak intensity ratio ($I_{(002)}/I_{(110)}$) of a peak intensity at a (002) plane relative to a peak intensity at a (110) plane of a first negative electrode coating layer and a second electrode coating layer prepared by coating the compositions before compression, may be about 50 or less, or about 1 to about 50. As such, when the peak intensity ratios ($I_{(002)}/I_{(110)}$) before and after compression are within the above ranges, respectively, a distance for transferring lithium ions in the first negative active material layer and the second negative active material layer may be shortened and ion resistance of the first negative active material layer and the second negative active material layer may be reduced.

As such, the peak intensity ratio ($I_{(002)}/I_{(110)}$) is a peak intensity ratio of the oriented layer. Herein, the term "oriented layer" indicates that, as described above, a composition for the negative active material layer is coated on a current collector, while a magnetic field is applied, such that the negative active material is oriented on the current collector. For example, the negative active material may be oriented at a set or predetermined angle. In some embodiments, as briefly shown in FIG. 1, the term "oriented layer" indicates that a negative active material 3 is oriented to one side of a current collector 1 with an angle (a). Accordingly, a negative active material prepared by coating without applying a magnetic field refers to a non-oriented layer.

In a non-oriented layer, the peak intensity ratio ($I_{(002)}/I_{(110)}$) may generally be about 150 or more after coating and before compression, and about 300 to about 600 after compression, which may be extremely higher than those of the first negative active material layer and the second negative active material layer according to one embodiment.

In one embodiment, the first negative active material layer and the second negative active material layer are oriented layers and the peak intensity ratio ($I_{(002)}/I_{(110)}$) of the oriented layer may be about 90% or less or about 1% to about 90% of the peak intensity ratio ($I_{(002)}/I_{(110)}$) of the non-oriented layer. When the peak intensity ratio ($I_{(002)}/I_{(110)}$) of the first negative active material layer and the second negative active material layer is about 90% or less, the distance for transferring lithium ions in the first negative active material layer and the second negative active material layer may be shortened and ion resistance of the first negative active material layer and the second negative active material layer may be decreased. In one embodiment, the non-oriented layer used to calculate the ratio related to the oriented layer may have substantially the same composition and thickness as the first negative active material layer and the second negative active material layer.

In one embodiment, the XRD measurement may be made using a CuKα ray as a target ray, a New Bruker D8 XRD equipment, and an area method using Fullprof. Herein, the measurement was performed under a condition of 2θ=10° to 80°, 0.02 s/step to 0.08 s/step, and a step size of 0.01°/step to 0.03°/step.

In one embodiment, the first negative active material layer may have substantially the same peak intensity ratio ($I_{(002)}/I_{(110)}$) as that of the second negative active material layer (e.g., a difference value being 0), or in another embodiment, the first negative active material layer may have a larger peak intensity ratio ($I_{(002)}/I_{(110)}$) than that of the second negative active material layer, and the difference may be up to about 50. Furthermore, before compression, the peak intensity ratio ($I_{(002)}/I_{(110)}$) of the first negative electrode coating layer may also be the same (or substantially the same) as that of the second negative electrode coating layer, or the peak intensity ratio ($I_{(002)}/I_{(110)}$) of the first negative electrode coating layer may be larger than that of the second negative electrode coating layer, and the difference may be up to about 20.

In one embodiment, the first negative active material layer and the second negative active material layer may be formed on one side or both sides of the current collector.

A thickness of the first negative active material layer may be about 20 μm to about 125 μm based on a cross-section of the first negative active material layer, and a thickness of the second negative active material may be about 20 μm to about 125 μm based on a cross-section of the second negative active material. Furthermore, a sum of thicknesses of the first negative active material layer and the second negative active material layer may be about 40 μm to about 250 μm based on a cross-section of the first negative active material layer and the second negative active material layer. Thus, if the first negative active material layer and the second negative active material layer are formed on the both sides of the current collector, a total thickness of the negative active material layers may be up to about 500 μm, which is very much larger than a maximum thickness 200 μm of both sides of other negative active material layers in the art. In one embodiment, the peak intensity ratio ($I_{(002)}/I_{(110)}$) of the first negative active material layer and the second negative active material layer is controlled to improve the impregnation of the electrolyte, so even if a thick layer is formed, rapid charge and discharge may be effectively performed, and thus, it may be suitably applied to a high-power battery.

As described herein, the thicknesses of the first negative active material layer and the second negative active material layer indicate thicknesses after drying and compressing during the negative electrode preparation.

In one embodiment, the peak intensity ratio ($I_{(002)}/I_{(110)}$) is obtained by charging and discharging a rechargeable lithium battery including the negative electrode and disassembling the battery when fully discharged to obtain the negative electrode and measuring the negative electrode through XRD. Furthermore, the peak intensity ratio ($I_{(002)}/I_{(110)}$) of the first negative active material layer is obtained by taking off the negative active material layer using tape after charge and discharge and measuring the active material layer attached to the current collector by XRD.

The charge and discharge are performed once or twice at about 0.1 C to about 2.0 C.

In one embodiment, the first negative active material and the second negative active material included in the first negative active material layer and the second negative active material layer may be the same as or different from each other, and may be a crystalline carbon-based active material. The crystalline carbon-based negative active material may be artificial graphite, natural graphite, or a mixture of artificial graphite and natural graphite. When the negative active material is a crystalline carbon-based material such as artificial graphite or a mixture of natural graphite and artificial graphite, the crystalline carbon-based material has more developed crystalline characteristics than an amorphous carbon-based active material, and thus, may further improve orientation characteristics of a carbon material in an electrode with respect to an external magnetic field. The artificial graphite or natural graphite may be an unspecified-shaped, sheet-shaped, flake-shaped, spherically-shaped, fiber-shaped, or a combination thereof without a particular limit. In addition, the artificial graphite may be mixed together with the natural graphite in a ratio of about 70:30 wt % to about 95:5 wt %.

Furthermore, the negative active material layer may include at least one non-carbon-based material selected from a Si-based negative active material, a Sn-based negative active material, or a lithium vanadium oxide negative active material. When the negative active material layer further includes these materials, for example, includes the carbon-based negative active material as a first negative active material and the non-carbon-based material as a second negative active material, the first and second negative active materials may be mixed together in a weight ratio of about 50:50 to about 99:1.

The Si-based negative active material may be Si, a Si—C composite, $SiO_x$ ($0<x<2$), and/or a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), and the Sn-based anode active material may be selected from Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Si), and the like and also, a mixture of at least one thereof with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

According to one embodiment, the negative active material may be the Si-carbon composite, and the Si-carbon composite may include silicon particles and crystalline carbon. The silicon particles may have an average a particle diameter (D50) of about 10 nm to about 200 nm. The Si—C composite may include an amorphous carbon layer at least partially formed thereon. In the present specification, unless otherwise defined herein, the term "average particle diameter (D50)" means the diameter of particles having a cumulative volume of 50 vol % in the particle size distribution. Furthermore, the mixing ratio of the silicon particles and the crystalline carbon may be about a 1:99 to about a 90:10 weight ratio, and if the amorphous carbon layer is further included, the amount of the amorphous carbon layer may be about 1 part by weight to about 20 parts by weight based on the total 100 parts by weight of the Si-carbon composite.

In the first negative active material layer, an amount of the first negative active material may be about 90 wt % to about 98 wt % based on the total weight of the first negative active material layer, and in the second negative active material layer, an amount of the second negative active material may be about 90 wt % to about 99 wt % based on the total weight of the second negative active material layer.

The first negative active material layer and the second negative active material layer include a binder, and may further include a conductive material (e.g., an electrically conductive material). In the first negative active material layer or the second negative active material layer, an amount of the binder may be about 1 wt % to about 5 wt % based on the total weight of the first negative active material layer or the second negative active material layer. Furthermore, when the conductive material is further included, the first negative active material layer may include about 85 wt % to about 97 wt % of the negative active material, about 1.0 wt % to about 7.5 wt % of the binder, and about 1.0 wt % to about 7.5 wt % of the conductive material, and the second negative active material layer may include about 90 wt % to about 98 wt % of the negative active material, about 1.0 wt % to about 5 wt % of the binder, and about 1.0 wt % to about 5 wt % of the conductive material.

Generally, the binder in the negative active material layer is mainly distributed in the upper portion which is not in contact (e.g., physical contact) with the current collector, and is less distributed in the bottom portion in contact (e.g., physical contact) with the current collector. For example, the binder may be non-uniformly distributed in the active material layer.

In one embodiment, the active material layer is formed as the two layers of the first negative active material layer and the second negative active material layer so that the binder may be uniformly (or substantially uniformly) distributed in the active material layer.

The amount of the binder in the first negative active material layer is substantially similar to that of the binder in the second negative active material layer, and it may be determined by measuring the peel strength. The ratio of the peel strength of the first negative active material layer to that of the second negative active material layer may be about 70% to about 90%. The ratio of the peel strengths within the above range indicates total and uniform (or substantially uniform) distribution of the binder in the active material layer, so that the negative electrode may exhibit excellent mechanical characteristics.

If the amount of the binder in the first negative active material layer is not substantially similar to that of the binder in the second negative active material layer, for example, the amount of the binder in the second negative active material layer is larger than that of the binder in the first negative active material layer, then the ratio of the peel strength may be about less than about 70%, for example, about 50% to about 60%.

In one embodiment, the peel strength may be obtained by separating and obtaining the first negative active material layer and the second negative active material layer from the negative electrode using SAICAS (Surface And Interfacial Cutting Analysis System) equipment and measuring, respectively.

In addition, if the first negative active material layer and the second negative active material layer are formed on both sides of the current collector, the peel strengths may be similar. The peel strengths will be described in more detail herein below.

When one side of the current collector is referred to as an A plane and another side opposite to the one side of the current collector is referred to as a B plane, the ratio of the peel strength of the first negative active material layer to that of the second negative active material layer formed on the A plane refers to a value a, and the ratio of the peel strength of the first negative active material layer to that of the second negative active material layer formed on the B plane refers to a value b.

According to one embodiment, the value a and the value b may be the same, and, even if there is a difference, the difference may be about 10% or less. If the value a is not the same as the value b, the value a may be larger than the value b by up to about 10%, or conversely, the value b may be larger than the value a by up to about 10%.

The binder improves binding properties of negative active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinylchloride, carboxylated polyvinylchloride, polyvinylfluoride, polyurethane, polytetrafluoro ethylene, polyvinylidene fluoride, polyethylene, polypropylene, polyamide imide, polyimide, or a combination thereof.

The aqueous binder may be a styrene-butadiene rubber (SBR), an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polypropylene, polyepichlorohydrin, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the aqueous binder is used as a negative electrode binder, a cellulose-based compound may be further used to provide viscosity as a thickener. The cellulose-based compound may include one or more of carboxymethyl cellulose, hydroxypropylmethyl cellulose, methyl cellulose, or alkali metal salts thereof. The alkali metal may be Na, K, or Li. The thickener may be included in an amount of about 0.1 parts by weight to about 3 parts by weight based on 100 parts by weight of the negative active material.

The conductive material is included to provide electrical conductivity, and any suitable electrically conductive material may be used as a conductive material unless it causes a chemical change (e.g., an undesirable chemical change in the rechargeable lithium battery). Examples of the conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The negative electrode having the peak intensity ratio ($I_{(002)}/I_{(110)}$) may include the negative active material included in the negative active material layer oriented with a set or predetermined angle. For obtaining these, the condition for applying the magnetic field and the viscosity of the active material composition is suitably adjusted during coating the negative active material composition on the current collector.

The negative electrode according to one embodiment may be prepared by the following procedure.

The negative active material layer may be prepared by concurrently (e.g., simultaneously) coating the composition for the first negative active material layer and the composition for the second negative active material layer via dual die coating, or coating the composition for the first negative active material layer and then coating the composition for the second negative active material layer; and drying.

When the negative active material layer preparation is illustrated in more detail, the composition for the first negative active material layer and the composition for the second negative active material layer are concurrently (e.g., simultaneously) or respectively coated to form a first layer and a second layer and a magnetic field is applied into the resulting product. The applying of the magnetic field may be performed by providing a magnet beneath the current collector and moving the current collector sequentially formed with the first layer and the second layer. Herein, the positioning of the magnet may allow application of the magnetic field to the first and the second negative active material layers.

If the first negative active material layer and the second negative active material are formed on both sides of the current collector, a first negative active material layer and a second negative active material layer are formed on one side of the current collector, and first and second negative active material layers are then formed on other side of the current collector on which the first and second negative active material layers are not formed in the same manner.

The magnet may have a magnetic field strength of about 4000 Gauss or more, or about 4000 Gauss to about 20000 Gauss. In addition, the first and second negative active material compositions may be coated on the current collector and maintained for about 1 second or more and about 5 seconds or less, for example, may be exposed to the magnetic field for about 1 second to about 5 seconds. Furthermore, the magnet may be suitably positioned to be spaced apart from the current collector by about 3 mm to about 50 mm. If a distance between the magnet and the current collector is out of the above range, the magnetic field applied to the negative active material layer may be too weak or too strong so that the negative electrode having suitable or desired physical properties may not be prepared.

When such an application of the magnetic field is performed, for example, when the coating process is performed while the current collector having the first layer and the second layer sequentially formed thereon is moved, the magnetic field (magnetic flux) by the magnet may be formed vertically relative to the current collector, but because the magnetic field according to a coating speed (a speed of moving the current collector) is formed at a set or predetermined angle as a vector function, the first and second negative active materials included in the first and the second compositions may stand, for example, be oriented at the set or predetermined angle on the surface of the current collector.

The composition for the first negative active material layer and the composition for the second negative active material layer may have suitable viscosity of about 1500 cP to about 3500 cP at room temperature (about 20° C. to about 25° C.). As such, when the strength of the magnetic field and time for exposing the magnetic field are satisfied, the negative electrode having the peak intensity ratio ($I_{(002)}/I_{(110)}$) of about 150 or less of the first negative active material layer and the second negative active material layer may be obtained.

Furthermore, the viscosities of the first negative active material layer composition and the second negative active material layer composition may bee adjusted to form the first layer and the second layer having a different peak intensity ratio ($I_{(002)}/I_{(110)}$) therewith, even though the same (or substantially the same) magnetic fields are applied for the first negative active material layer and the second negative active material layer. In some embodiments, a difference of the viscosity of the first negative active material layer composition from the second negative active material layer composition may be about 1500 cP or less, or about 10 cP to about 1500 cP at room temperature (about 20° C. to about 25° C.). For example, the viscosity of the first negative active material layer composition may be about 1500 cP to about 3500 cP, or about 2000 cP to about 3500 cP at a room temperature (about 20° C. to about 25° C.). The viscosity of the second negative active material layer composition may be about 1500 cP to about 3500 cP, or about 1500 cP to about 3000 cP at room temperature (about 20° C. to about 25° C.). The viscosities of the first negative active material layer composition and the second negative active material layer composition may be controlled within the above ranges. If a composition having a viscosity out of the range is used, the peak intensity ratio according to one embodiment may not be obtained, even if a magnetic field of about 4000 Gauss or more is applied.

When the viscosity of the first negative active material layer composition and the second negative active material layer composition satisfies the above ranges, the first negative active material layer and the second negative active material layer having a suitable or desired peak intensity ration may be obtained. A viscosity of the first negative active material layer composition lower than the above range causes an extreme increase in a degree of verticality of the first carbon-based negative active material included in the first negative active material layer, for example, the angle a shown in FIG. 1 to cause poor particle contact of the negative active material, and thus, the electron transportation resistance in the first negative active material layer may be increased. Whereas, a viscosity higher than the above range may be unable to orientate, for example, the first negative active material included in the first negative active material layer may be substantially horizontally positioned with respect to the current collector.

If the second negative active material layer composition has a viscosity lower (e.g., smaller) than the range, the second negative active material included in the second negative active material layer has an extremely high degree of verticality which causes poor contact of the negative active material particles, and thus, electron transportation resistance in the second negative active material layer may be increased. Whereas if the viscosity is larger than the range, orientation of the second negative active material may insufficiently occur and deteriorate electrolyte impregnation of the second negative active material layer.

The first layer composition and the second layer composition may be respectively produced by mixing together the negative active material, the binder, and optionally the conductive material in a solvent. In one embodiment, the amount of the binder in the first negative active material layer composition may be larger than that of the binder in the second negative active material layer composition, and for example, the amount of the binder in the first negative active material layer composition may be about 0.5 wt % to about 4 wt % higher than that of the binder in the second negative active material layer composition. If the amount of the binder in the first negative active material layer composition is larger than that of the binder in the second negative active material layer composition, for example, is within the foregoing range, the binder included in the first negative active material layer composition may be moved into the second negative active material layer composition during the electrode preparation, and thus, the amount of the binder in the first negative active material layer and the binder in the second negative active material layer may be substantially similar in the final produced negative electrode, thereby preparing the uniform (or substantially uniform) electrode.

The negative active material, the binder and the conductive material may be the same as described above.

Thereafter, the current collector formed with the first layer and the second layer may be dried and compressed to prepare the first negative active material layer and the second negative active material layer. The drying and the compressing may be performed under any suitable negative electrode preparation conditions generally used in the related art, but are not limited thereto.

A rechargeable lithium battery according to another embodiment includes the negative electrode, a positive electrode, and an electrolyte.

The rechargeable lithium battery may be a battery for high-power application. In other words, the rechargeable lithium battery may be usefully applied to an electronic device requiring high power such as a power tool, an electric vehicle, a vacuum cleaner, and/or the like. The reason is that the rechargeable lithium battery including the anode according to an embodiment may easily release heat generated during the charge and discharge, for example, when applied to a high-capacity cell and an electronic device for high power, and thus, deterioration of the rechargeable lithium battery due to heat may be suppressed or reduced, and the rechargeable lithium battery may effectively be used as a high power battery. In addition, the rechargeable lithium battery may easily release heat according to the charge and discharge and a battery temperature increase may be effectively suppressed or reduced, and thus, effectively improve cycle-life characteristics and, for example, cycle-life characteristics at a high rate.

Embodiments of the high power battery may be a cylindrical or a pouch-shaped battery. In addition, embodiments of the cylindrical battery may be a 18650 battery (a diameter of 18 mm, a height of 65 mm) and a 21700 battery (a diameter of 21 mm, a height of 70 mm), but is not limited thereto.

The positive electrode may include a positive current collector and a positive active material layer formed on the positive current collector. The positive active material may include lithiated intercalation compounds that reversibly intercalate and deintercalate lithium ions. For example, one or more composite oxides of a metal selected from cobalt, manganese, nickel, and a combination thereof, and lithium, may be used. In some embodiments, the compounds represented by one of the following chemical formulae may be used. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 < \alpha \le 2$); $Li_aNi_{1-b-c}Co_bX_cO_{2-\alpha}T_\alpha$ ($0.90 \le a \le 1.8$, $0 \le 0.5$, $0 \le c \le 0.5$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.5$, $0 < \alpha < 2$); $Li_aNi_{1-b-c}Mn_bX_cD_\alpha$ ($0.90 \le a \le 1.8$, $0 \le b \le 0.5$, $0 \le c \le 0.5$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.5$, $0 < \alpha < 2$); $Li_aNi_{1-b-c}Mn_bX_cO_{2-\alpha}T_2$ ($0.90 \le a \le 0 \le b \le 0.5$, $0 \le c \le 0.5$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_b Co_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_a CoG_bO_2$ ($0.90 \le a \le 1.8$, $0.001 \le b \le 0.1$); $Li \le MnSG \le O_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

Also, the compounds may have a coating layer on the surface, or may be mixed together with another compound having a coating layer. The coating layer may include at least one coating element compound selected from the group consisting of an oxide of the coating element, a hydroxide of the coating element, an oxyhydroxide of the coating element, an oxycarbonate of the coating element, and a hydroxyl carbonate of the coating element. The compound for the coating layer may be amorphous and/or crystalline. The coating element included in the coating layer may include Mg, Al, Co, K, Na, Ca, Si, Ti, V, Sn, Ge, Ga, B, As, Zr, or a mixture thereof. The coating layer may be formed by any suitable method having no (or substantially no) adverse influence on properties of a positive active material by using these elements in the compound, and for example, the method may include any suitable coating method such as spray coating, dipping, and/or the like. The coating method is not described in more detail here, because it should be readily apparent from the present description to those of ordinary skill in the art.

In the positive electrode, an amount of the positive active material may be about 90 wt % to about 98 wt % based on the total weight of the positive active material layer.

In an embodiment, the positive active material layer may further include a binder and a conductive material (e.g., an electrically conductive material). Herein, the binder and the conductive material may be included in an amount of about 1 wt % to about 5 wt %, respectively, based on the total amount of the positive active material layer.

The binder improves binding properties of positive active material particles with one another and with a current collector. Examples of the binder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene butadiene rubber, acrylated styrene butadiene rubber, an epoxy resin, nylon, and the like, but are not limited thereto.

The conductive material is included to provide electrical conductivity, and any suitable electrically conductive material may be used as a conductive material unless it causes a chemical change (e.g., an undesirable chemical change in the rechargeable lithium battery). Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The positive active material layer may further include oxalic acid in order to control viscosity of the positive active material composition. When oxalic acid is further included, an amount of oxalic acid may be about 0.01 parts by weight to about 2.0 parts by weight based on 100 parts by weight of the positive active material layer.

Furthermore, the positive active material layer may further include a nitrile additive in order to improve safety. The nitrile additive may be a compound including a —C≡N functional group and/or nitrile rubber. The compound including the —C≡N functional group may be cyanohydrins, acetonitrile, methylcyanoacrylate, or a combination thereof. When the nitrile additive is further included, an amount of the nitrile additive may be about 0.01 parts by weight to about 1 part by weight based on 100 parts by weight of the positive active material layer.

The current collector may include Al, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. Furthermore, the ketone-based solvent may include cyclohexanone and/or the like. The alcohol-based solvent may include ethyl alcohol, isopropyl alcohol, and/or the like, and examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable or suitable battery performance and mixture ratio may be any suitable mixture ratio generally used in the related art.

Furthermore, the carbonate-based solvent may include a mixture with a cyclic carbonate and a linear carbonate. The cyclic carbonate and linear carbonate are mixed together in a volume ratio of about 1:1 to about 1:9, and when the mixture is used as an electrolyte, it may have enhanced performance.

The organic solvent may further include an aromatic hydrocarbon-based solvent as well as the carbonate-based solvent. Herein, the carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 3.

Chemical Formula 3

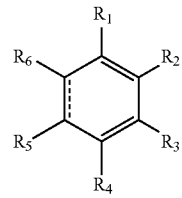

In Chemical Formula 3, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate and/or an ethylene carbonate-based compound represented by Chemical Formula 4 to improve cycle life.

Chemical Formula 4

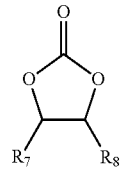

In Chemical Formula 4, $R_7$ and $R_8$ are the same or different and may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group (NO$_2$), or a C1 to C5 fluoroalkyl group, and R$_7$ and R$_8$ are not simultaneously hydrogen.

Examples of the ethylene carbonate-based compound include difluoro ethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle life may be flexibly used within a suitable or appropriate range.

The non-aqueous organic solvent may further include vinylethylene carbonate, hexanetricyanide, lithium tetrafluoroborate, propane sultone, etc., as an additive.

The lithium salt dissolved in an organic solvent supplies a battery with lithium ions, basically operates the rechargeable lithium battery, and improves transportation of the lithium ions between the positive electrode and the negative electrode. Examples of the lithium salt may include one or two or more selected from LiPF$_6$, LiBF$_4$, LiSbF$_6$, LiAsF$_6$, LiN(SO$_2$C$_2$F$_5$)$_2$, Li(CF$_3$SO$_2$)$_2$N, LiN(SO$_3$C$_2$F$_5$)$_2$, LiC$_4$F$_9$SO$_3$, LiClO$_4$, LiAlO$_2$, LiAlCl$_4$, LiPO$_2$F$_2$, LiN(C$_x$F$_{2x+1}$SO$_2$)(C$_y$F$_{2y+1}$SO$_2$)(where x and y are natural numbers, for example integers of 0 to 20), lithium difluorobis (oxalato) phosphate, LiCl, LiI, LiB(C$_2$O$_4$)$_2$ (lithium bis (oxalato) borate: LiBOB), and lithium difluoro (oxalato) borate (LiDFOB). A concentration of the lithium salt may be in a range from about 0.1 M to about 2.0 M. When the lithium salt is included at the above concentration range, an electrolyte may have excellent performance and lithium ion mobility due to suitable or optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
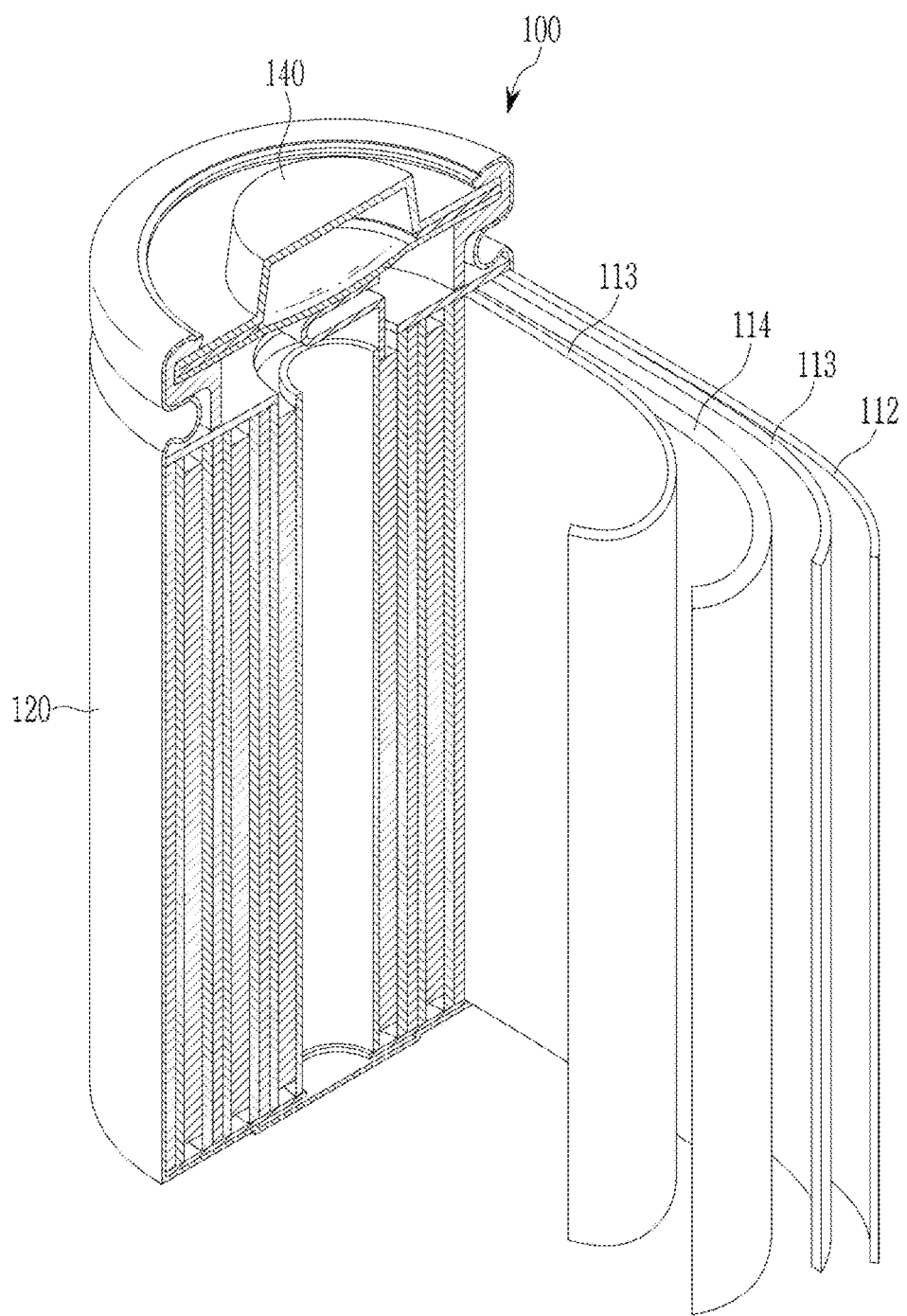
FIG. 2 is an exploded perspective view of a rechargeable lithium battery according to one embodiment of the present disclosure.

FIG. 2 is an exploded perspective view of a rechargeable lithium battery according to an embodiment. A rechargeable lithium battery according to an embodiment may be a cylindrical battery.

Referring to FIG. 2, a rechargeable lithium battery 100 is a cylindrical battery and includes a negative electrode 112, a positive electrode 114, and a separator 113, an electrolyte immersed into the negative electrode 112, the positive electrode 114, and the separator 113, a battery case 120, and a sealing member 140 sealing the battery case 120.

Such a rechargeable lithium battery 100 is manufactured by sequentially stacking the negative electrode 112, the separator 113, and the positive electrode 114, winding it in a spiral form, and housing it the battery case 120.

Hereinafter, examples of embodiments of the present disclosure and comparative examples are described. These examples, however, are not in any sense to be interpreted as limiting the scope of the present disclosure.

Example 1

94.4 wt % of natural graphite, 2.6 wt % of a Si-carbon composite, 2.0 wt % of styrene butadiene rubber, and 1.0 wt % of carboxymethyl cellulose were mixed together with a water solvent to prepare a slurry for a first negative active material layer, having a viscosity (at 25° C.) of 2568 cP.

95.8 wt % of natural graphite, 2.7 wt % of a Si-carbon composite, 0.5 wt % of styrene butadiene rubber, and 1.0 wt % of carboxymethyl cellulose were mixed together with a water solvent to prepare a slurry for a second negative active material layer, having a viscosity (at 25° C.) of 2362 cP.

Herein, the Si-carbon composite had a core including artificial graphite and silicon particles and soft carbon coated on the surface of the core. The soft carbon coating layer had a thickness of 20 nm, and the silicon particles had an average particle diameter (D50) of 100 nm.

While a Cu foil current collector was moved, the slurry for the first negative active material layer and the slurry for the second negative active material layer were coated on the Cu foil via dual die coating to prepare a first layer and a second layer on the Cu foil, and then the resulting Cu foil (thickness of 10 µm) was positioned on a magnet having a magnetic field strength of 6000 Gauss to 7000 Gauss while spaced apart from the magnet by 3 mm to 10 mm. Thereafter, the Cu foil was moved along with the magnet to expose it to a magnetic field for 1 second to 3 seconds. Thereafter, the resulting product was dried to prepare a first negative active material layer having a cross-section thickness of 65 µm and a second negative active material layer having a cross-section thickness of 65 µm. First and second negative active material layers were formed on an opposite side (negative active material layer was not formed) of the Cu foil on which the first and second negative active material layers were formed by the same procedure, thereby fabricating a negative electrode. The resultant negative electrode had a thickness of 270 µm (including the current collector of 10 µm).

After the first negative active material layer and the second negative active material layer were formed, compression was performed to prepare a negative electrode. In the negative electrode, the cross-section thickness of the first negative active material layer was 42 µm and the cross-section thickness of the second negative active material layer was 42 µm, so that the total thickness of the negative electrode was 178 µm, after compression.

97.36 wt % of LiNi$_{0.8}$Co$_{0.1}$Al$_{0.1}$O$_2$, 1.3 wt % of a carbon black conductive material, 1.1 wt % of polyvinylidene fluoride, 0.1 wt % of oxalic acid and 0.14 wt % of nitrile rubber were mixed together in an N-methyl pyrrolidone solvent to prepare a positive active material slurry. The positive active material slurry was coated on an Al current collector, dried, and compressed to prepare a positive electrode.

The negative electrode, the positive electrode and an electrolyte were used to manufacture a 21700-type cylindrical rechargeable lithium battery cell which is a full cell having cell capacity of 4933 mAh and current density of 4.72 mAh/cm$^2$. Herein, the electrolyte was prepared by using a mixed solvent of ethylene carbonate, ethyl methyl carbonate, and dimethyl carbonate (a volume ratio of 20:10:70) and dissolving 1 M LiPF$_6$ therein.

Example 2

91.8 wt % of natural graphite, 5.2 wt % of a Si-carbon composite, 2.0 wt % of styrene butadiene rubber, and 1.0 wt % of carboxymethyl cellulose were mixed together with a water solvent to prepare a slurry for a first negative active material layer, having a viscosity (at 25° C.) of 2564 cP.

98.5 wt % of natural graphite, 0.5 wt % of styrene butadiene rubber, and 1.0 wt % of carboxymethyl cellulose were mixed together with a water solvent to prepare a slurry for a second negative active material layer, having a viscosity (at 25° C.) of 2235 cP.

A negative electrode in which a thickness of a first negative active material layer was 42 μm and a thickness of a second negative active material layer was 42 μm, so that a total thickness of the negative electrode was 178 μm, was prepared by substantially the same procedure as in Example 1, except that the slurry for the first negative active material layer and the slurry for the second negative active material layer were used.

The negative electrode, and the positive electrode and the electrolyte of Example 1, were used to manufacture a 21700-type cylindrical rechargeable lithium battery cell which is a full cell having cell capacity of 4933 mAh and current density of 4.72 mAh/cm².

Example 3

94.4 wt % of natural graphite, 2.6 wt % of a Si-carbon composite, 2.0 wt % of styrene butadiene rubber, and 1.0 wt % of carboxymethyl cellulose were mixed together with a water solvent to prepare a slurry for a first negative active material layer, having a viscosity (at 25° C.) of 2154 cP.

95.8 wt % of natural graphite, 2.7 wt % of a Si-carbon composite, 0.5 wt % of styrene butadiene rubber, and 1.0 wt % of carboxymethyl cellulose were mixed together with a water solvent to prepare a slurry for a second negative active material layer, having a viscosity (at 25° C.) of 2465 cP.

A negative electrode in which a thickness of a first negative active material layer was 42 μm and a thickness of a second negative active material layer was 42 μm, so that a total thickness of the negative electrode was 178 μm, was prepared by substantially the same procedure as in Example 1, except that the slurry for the first negative active material layer and the slurry for the second negative active material layer were used.

The negative electrode, and the positive electrode and the electrolyte of Example 1, were used to manufacture a 21700-type cylindrical rechargeable lithium battery cell which is a full cell having cell capacity of 4933 mAh and current density of 4.72 mAh/cm².

Comparative Example 1

The slurry for the first negative active material layer of Example 1 and the slurry for the second negative active material layer of Example 1 were coated on a Cu foil current collector (thickness of 10 μm) via dual die coating and dried to prepare a first negative active material layer having a cross-section thickness of 65 μm and the second negative active material layer having a cross-section thickness of 65 μm. A first negative active material layer and a second negative active material layer were formed on both side of the Cu foil, and thus, the total thickness of the resulting product was 270 μm (including the current collector of 10 μm).

After the first negative active material layer and the second negative active material layer were formed, compression was performed to prepare a negative electrode. In the negative electrode, the cross-section thickness of the first negative active material layer was 42 μm and the cross-section thickness of the second negative active material layer was 42 μm, so that the total thickness of the negative electrode was 178 μm, after compression. A rechargeable lithium battery was fabricated by substantially the same procedure as in Example 1, using the negative electrode, and the positive electrode and the electrolyte of Example 1.

Comparative Example 2

95.1 wt % of natural graphite, 2.6 wt % of a Si-carbon composite, 1.3 wt % of styrene butadiene rubber, and 1.0 wt % of carboxymethyl cellulose were mixed together with a water solvent to prepare a slurry for a first negative active material layer, having a viscosity (at 25° C.) of 1856 cP.

While a Cu foil current collector (thickness of 10 μm) was moved, the slurry for the first negative active material layer was coated on the Cu foil via slot die coating and dried to prepare a first negative active material layer having a cross-section thickness of 130 μm. The first negative active material layer was respectively coated on both sides of the Cu foil, and resultantly, the total thickness of both sides of the first negative active material layer was 270 μm (including the current collector of 10 μm).

After the first negative active material layer was formed, compression was performed to prepare a negative electrode. In the negative electrode, the cross-section thickness of the first negative active material layer was 84 μm, so that the total thickness of the negative electrode was 178 μm, after compression.

Using the above-described negative electrode, and the positive electrode and the electrolyte of Example 1, a rechargeable lithium battery was fabricated by the same procedure as in Example 1.

Experimental Example 1) SEM Photograph

Figure 3:
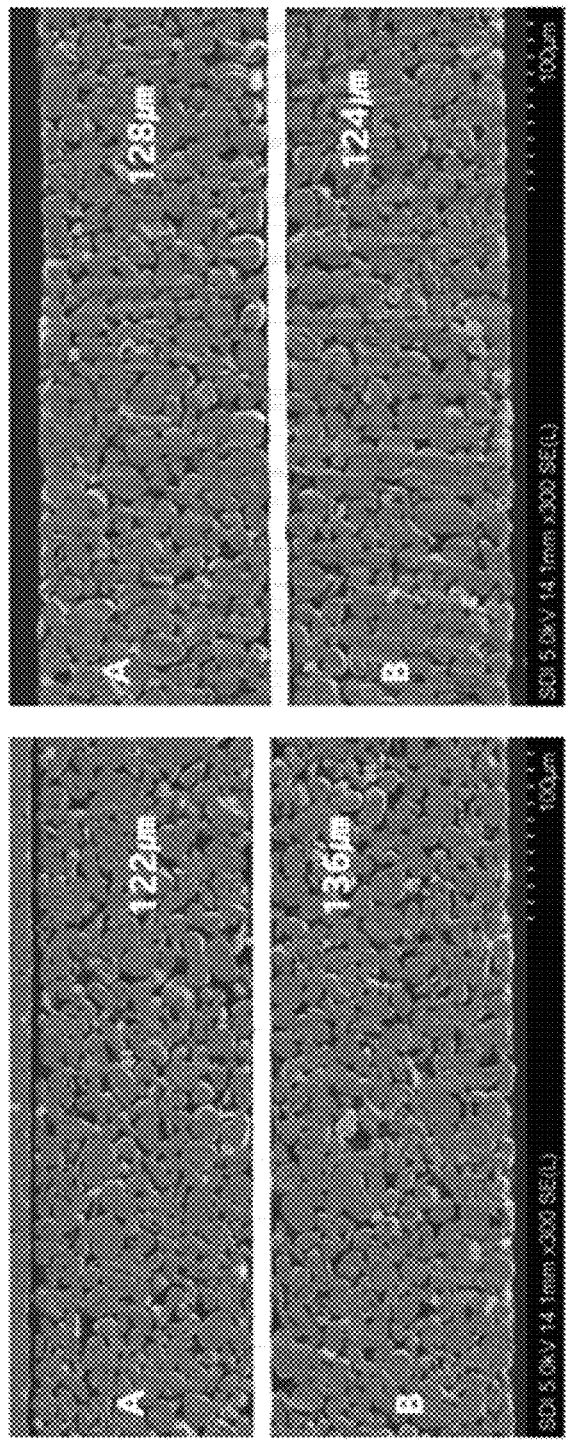
FIG. 3 is a series of SEM photographs showing the cross-section of respective negative electrodes prepared by Example 1 and Comparative Example 1, before compressing.

Cross-section SEM photographs for the negative electrode before compression according to Example 1 and Comparative Example 1 were measured. The results are shown in FIG. 3 as A and B. In FIG. 3, the white color on the center was the current collector, and the A and the B were negative active material layers on both sides of the current collector. The thickness value of the active material layer shown in FIG. 3 was the real measurement value. For example, in Example 1, the active material layer was formed at a thickness of 130 μm adding the first negative active material layer and the second negative active material layer, but it was really obtained as 128 μm and 124 μm, respectively, resulting from deviations caused during the preparation process. It is also considered that such a deviation will be readily understood in the related art. As shown in FIG. 3, the B sides (B of FIG. 3) and the A sides (A of FIG. 3) of Example 1 and Comparative Example 1 had similar morphology, but it can be seen that Example 1 had a degree of verticality, rather than Comparative Example 1.

From these results, it can be seen that the degree of verticality may actually be different due to the application of the magnetic field.

Experimental Example 2) Measurement of X-Ray Diffraction Characteristic

After coating, as for the negative electrodes of Example 1 and Comparative Example 1, XRD was measured by using a CuKα ray as a target ray and New Bruker D8 XRD equipment by the area procedure with Fullprof. Herein, the measurement was performed under a condition of 2θ=10° to 80°, 0.05 s/step, and a step size of 0.026°/step.

Figure 4:
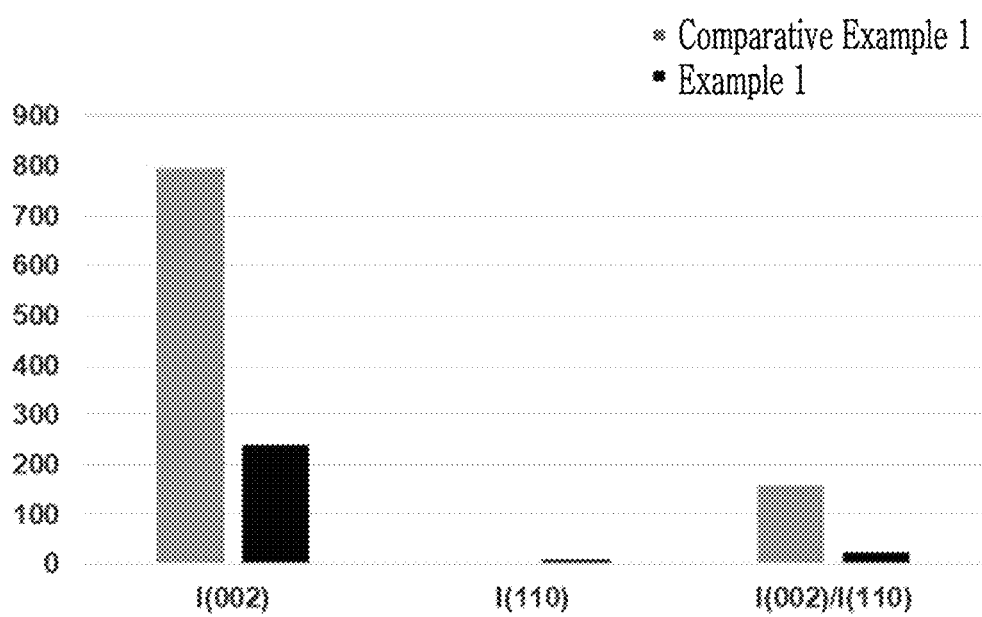
FIG. 4 is a graph showing peak intensities $I_{(002)}$ and $I_{(110)}$, and the corresponding peak intensity ratios ($I_{(002)}/I_{(110)}$), as measured by XRD using a CuKα ray, of respective negative electrode precursors prepared by coating a negative active material layer slurry of the process of Example 1 and Comparative Example 1.

From the measured results, the peak intensity $I_{(002)}$ and the peak intensity $I_{(110)}$ were measured, before compression. The results are shown in FIG. 4. In addition, from the measured result, the peak intensity ratio ($I_{(002)}/I_{(110)}$) was measured. The results are also shown in FIG. 4. The peak intensity measured in the experiment was obtained as the integral area value of the peak.

Figure 5:
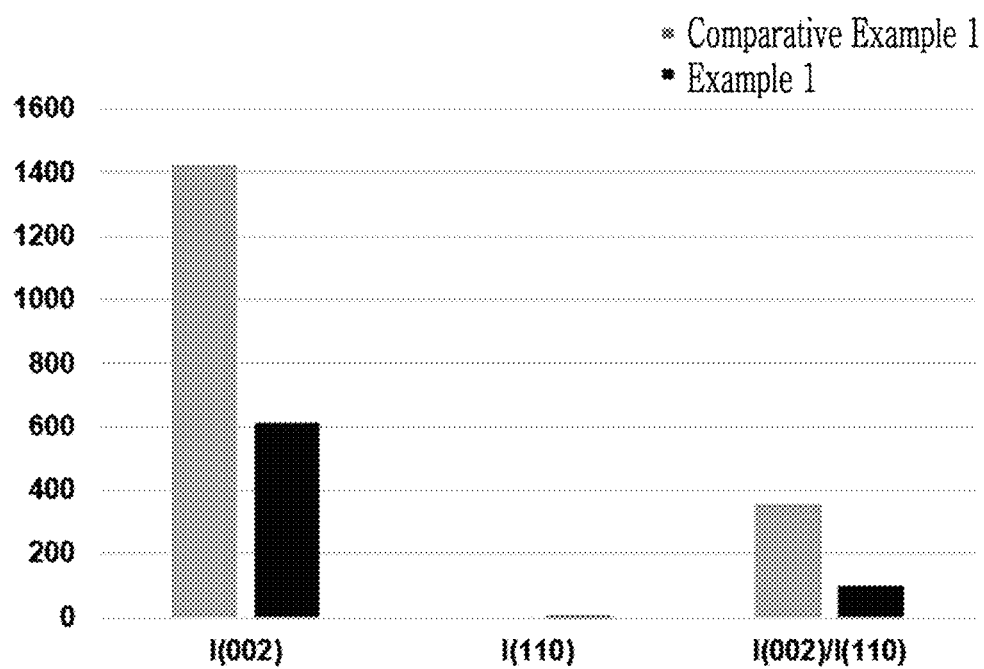
FIG. 5 is a graph showing peak intensities $I_{(002)}$ and $I_{(110)}$, and the corresponding peak intensity ratios ($I_{(002)}/I_{(110)}$), as measured by XRD using a CuKα ray, of respective negative electrodes prepared by coating a negative active material layer slurry of the process of Example 1 and Comparative Example 1 and then compressing the same.

The peak intensity $I_{(002)}$ and the peak intensity $I_{(110)}$ of the negative electrodes according to Example 1 and Comparative Example 1, after compression, were measured under the same condition. The results and the peak intensity ratio ($I_{(002)}/I_{(110)}$) obtained therefrom are shown in FIG. 5.

As shown in FIG. 4, the peak intensity ratio ($I_{(002)}/I_{(110)}$) of Example 1 was 24 and the peak intensity ratio ($I_{(002)}/I_{(110)}$) of Comparative Example 1 was 160, before compression. As shown in FIG. 5, the peak intensity ratio ($I_{(002)}/I_{(110)}$) of Example 1 was 116 and the peak intensity ratio ($I_{(002)}/I_{(110)}$) of Comparative Example 1 was 370, after compression.

It can be seen that from these results, the peak intensity ratio ($I_{(002)}/I_{(110)}$) of the negative active material layer with applying the magnetic field was 150 or less, and it was 90% or less relative to the peak intensity ratio ($I_{(002)}/I_{(110)}$) of the negative active material layer without applying the magnetic field.

Figure 6:
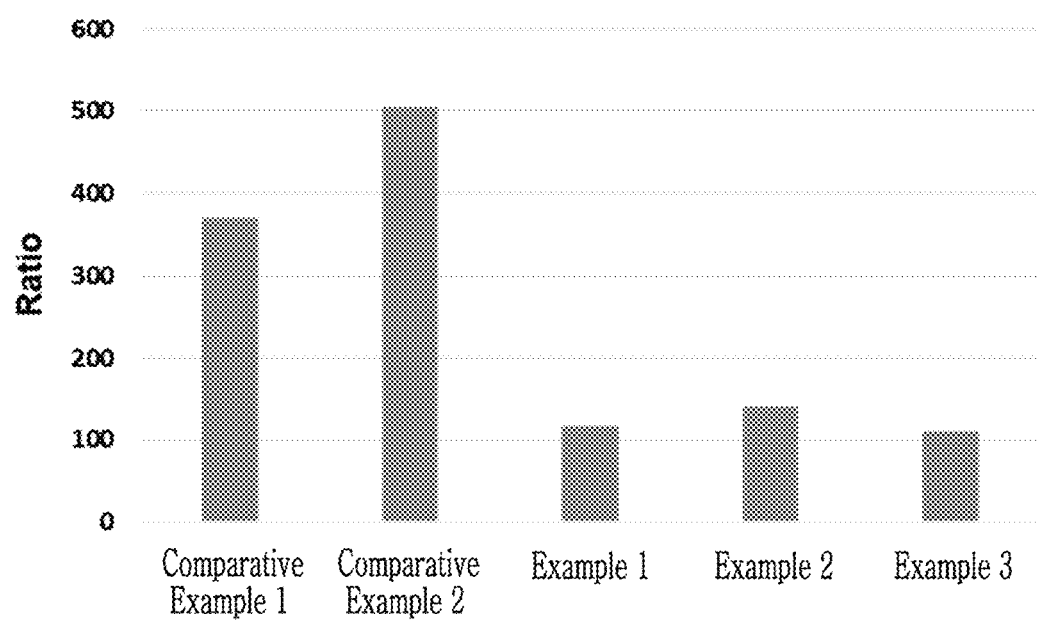
FIG. 6 is a graph comparing peak intensity ratios ($I_{(002)}/I_{(110)}$) of respective negative electrodes obtained from compressing the negative active material layer slurries according to Examples 1 to 3 and Comparative Examples 1 and 2.

The peak intensity $I_{(002)}$ and the peak intensity $I_{(110)}$ of the negative electrodes according to Examples 2 and 3 and Comparative Example 2 were measured under the same condition, and the peak intensity ratio ($I_{(002)}/I_{(110)}$) was obtained from these results. The results are shown in FIG. 6. For comparing, the peak intensity ratio ($I_{(002)}/I_{(110)}$) of Examples 1 and 2 are also shown in FIG. 6. As shown in FIG. 6, Example 1 was 116, Example 2 was 142, Example 3 was 110, Comparative Example 1 was 370, and Comparative Example 2 was 505.

From these results, the peak intensity ratios ($I_{(002)}/I_{(110)}$) of Examples 1 to 3 were 150 or less, but the peak intensity ratios of Comparative Example 1 and Comparative Example 2 without orienting by the magnetic field were much more than 150. Thus, it can be seen that the peak intensity ratio ($I_{(002)}/I_{(110)}$) is significantly different depending on performing/not-performing the orientation by the magnetic field.

Experimental Example 3) Measurement of peel strength

The binder distribution of the top (second negative active material layer) and bottom (first negative active material layer) of the negative electrodes according to Example 1 and Comparative Examples 1 and 2 were confirmed by measuring peel strength.

Figure 7:
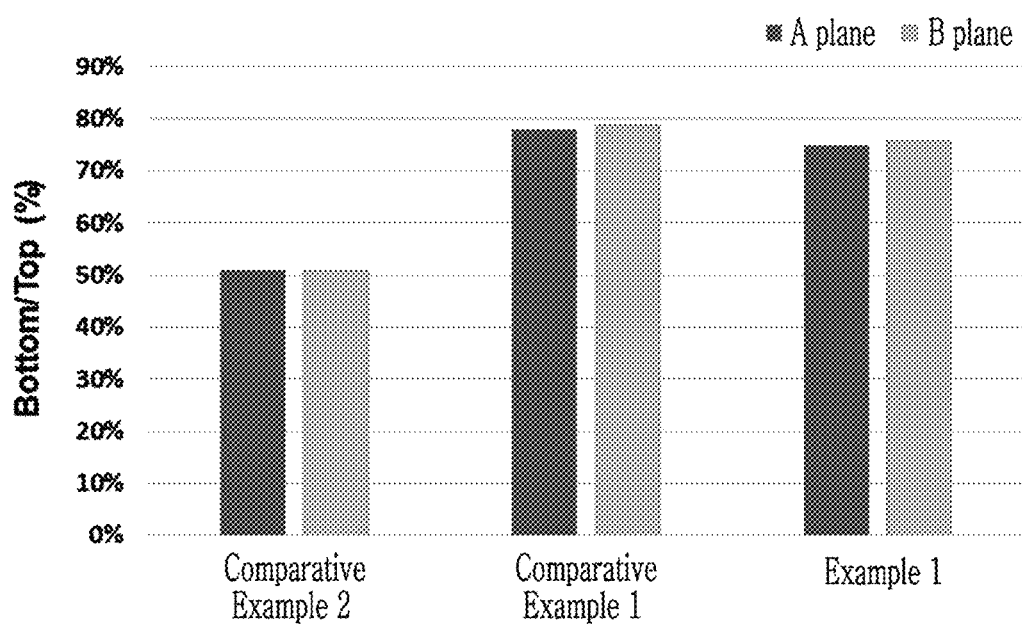
FIG. 7 is a graph showing the peal strength ratio (%) of the upper and lower portions of respective negative electrodes according to Example 1, Comparative Example 1, and Comparative Example 2.

The peel strength measurement was determined by cutting the negative electrode with a blade using SAICAS (Surface And Interfacial Cutting Analysis System) equipment and separating into the bottom (first negative active material layer) and top (second negative active material layer). From the resulting peel strength of the top and the bottom, the percent ratio of peel strength of bottom/peel strength of top was measured. The results are shown in FIG. 7. In FIG. 7, the A plane indicates the A plane of FIG. 3 and the B plane indicates the B plane of FIG. 3.

As shown in FIG. 7, Example 1 and Comparative Example 1 had the percent ratio of peel strength of bottom/peel strength of top of the A plane and the B plane of 70% or more (Example 1: A plane-75%, B plane-76%, Comparative Example 1: A plane-78%, B plane-79%), but Comparative Example 2 had about 50%.

The difference between the percent ratio of peel strength of bottom/peel strength of top of the A planes and the difference between the peel strength of the B planes according to Comparative Example 1 and Example 1 was 1%, which were substantially similar, and thus, the distribution ratio of the binder can be maintained, even though the magnetic field was applied to the active material layer.

From these results, it can be seen that when the negative active material layer is formed in two layers, the use amount of the binder in the first negative active material layer that is larger than in the second negative active material layer may allow uniform distribution of the binder throughout the active material layer.

Experimental Example 4) Measurement of Resistance

For the rechargeable lithium cells according to Example 1 and Comparative Example 1, ion resistance was measured by using an impedance analyzer (Solartron 1260A Impedance/Gain-Phase Analyzer) at 25° C. under a 2-probe method. The results are shown in FIG. 8.

Figure 8:
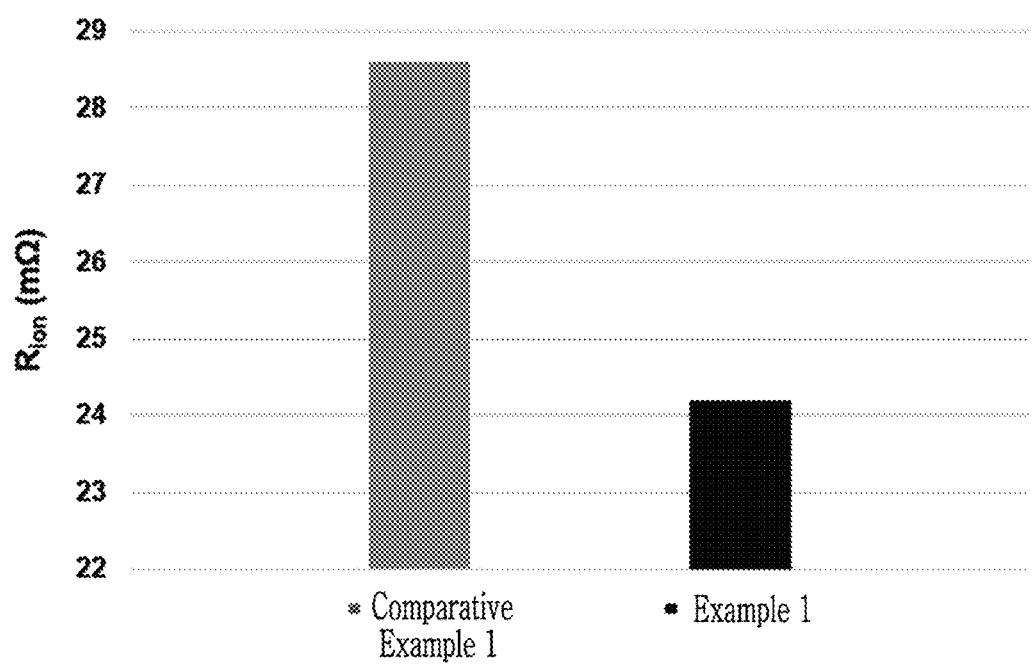
FIG. 8 is a graph showing ion resistance ($R_{ion}$) of respective negative electrodes according to Example 1 and Comparative Example 1.

As shown in FIG. 8, the ion resistance of Example 1 had significantly deteriorated rather than that of Comparative Example 1.

Experimental Example 5) Measurement of DC Internal Resistance (DC-IR: Direct Current Internal Resistance)

The direct current internal resistance (DC-IR) for the rechargeable lithium cells of Example 1 and Comparative Example 1 was evaluated by charging and discharging at 0.5C and under 25° C. while depth of discharge (ratio of discharge capacity to rated capacity) was changed into 0%, 10%, 20%, 40%, 50%, 60%, 70%, 80%, 90%, and 100%, and by measuring voltage drop (V), while a current flew at 0.5 C for 10 seconds. The results are shown in FIG. 9.

Figure 9:
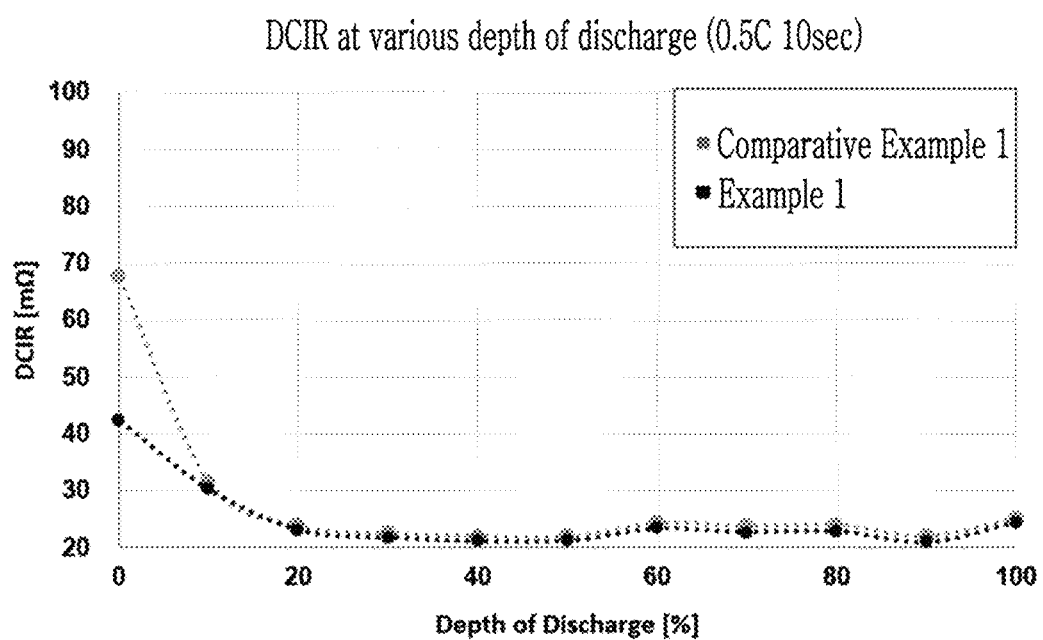
FIG. 9 is a graph showing DC internal resistance (DC-IR) at various depths of discharge of respective negative electrodes according to Example 1 and Comparative Example 1.

As shown in FIG. 9, the resistance of Example 1 was totally lower than that of Comparative Example 1 and particularly, the resistance at the initial (0%) depth of discharge was significantly lower than that of Comparative Example 1.

Experimental Example 6) Measurement of Cycle-Life Characteristics at Room Temperature and Low Temperature The rechargeable lithium cells of Example 1, Comparative Example 1, and Comparative Example 2 were charged and discharged at 1.0 C under 4.2 V to 2.5 V and at a room temperature (RT, 25° C.) 100 times. A capacity retention depending on charge and discharge cycles was evaluated by calculating a discharge capacity ratio at each cycle relative to discharge capacity at the first cycle. The results are shown in FIG. 10.

The rechargeable lithium cells of Example 1, Comparative Example 1, and Comparative Example 2 were charged and discharged at 1.0 C under 4.2 V to 2.5 V and at a low temperature (10° C.) 100 times. Capacity retention depending on charge and discharge cycles was evaluated by calculating a discharge capacity ratio at each cycle relative to discharge capacity at the first cycle. The results are shown in FIG. 11.

Figure 10:
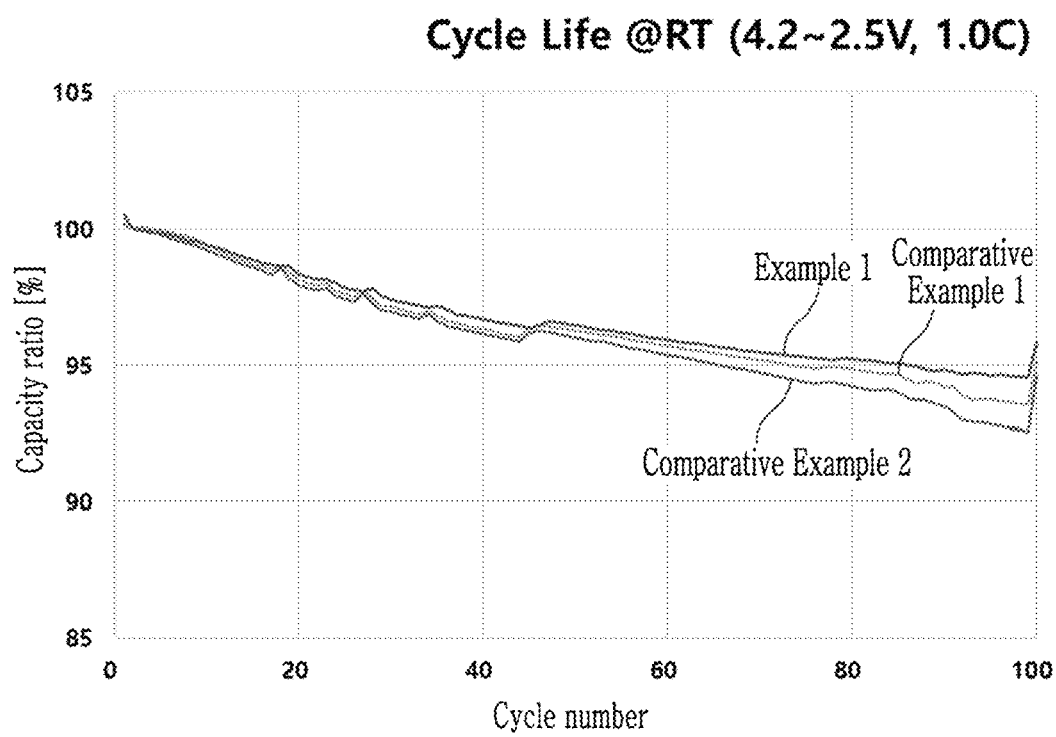
FIG. 10 is a graph showing the cycle-life characteristics at room temperature of respective negative electrodes according to Example 1, Comparative Example 1, and Comparative Example 2.
Figure 11:
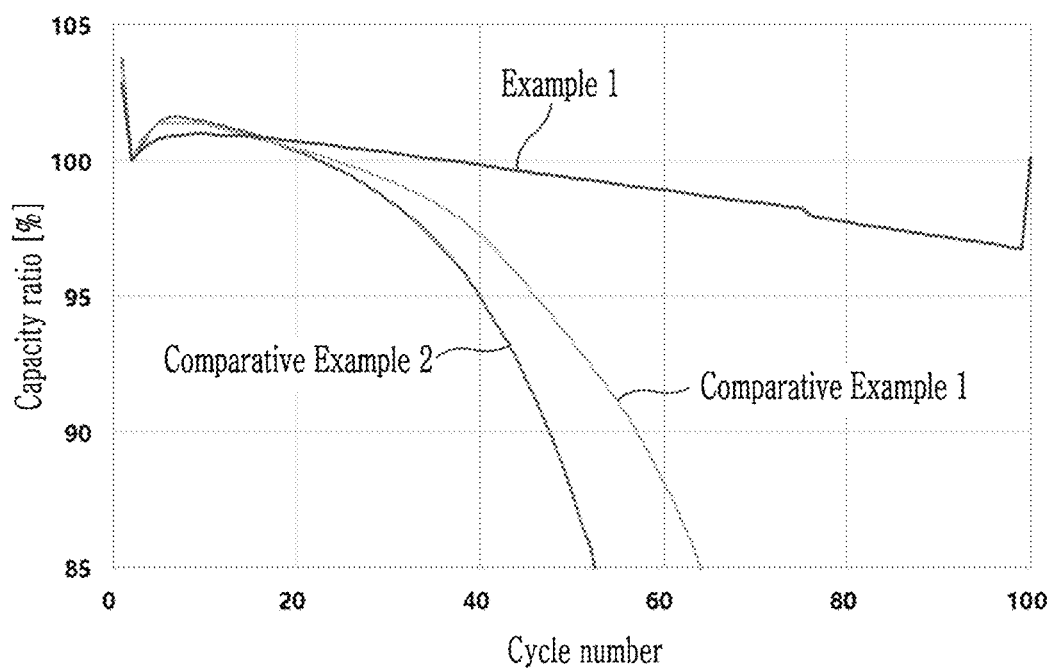
FIG. 11 is a graph showing the cycle-life characteristics at a low temperature of respective negative electrodes according to Example 1, Comparative Example 1, and Comparative Example 2.

As shown in FIG. 10 and FIG. 11, Example 1 exhibited excellent cycle-life characteristics at room temperature and a low temperature, rather than Comparative Example 1 and Comparative Example 2. In particular, Example 1 exhibited surprisingly excellent low temperature cycle-life characteristic compared to Comparative Example 1 and Comparative Example 2. Comparative Example 1 exhibited capacity retention of 85% for 64 cycles at a low temperature and Comparative Example 2 exhibited capacity retention of 85% for 50 cycles or more at a low temperature, and thus, the capacity retentions of Comparative Examples 1 and 2 were significantly deteriorated.

While the subject matter of this disclosure has been described in connection with what is presently considered to be practical example embodiments, it is to be understood that the present disclosure is not limited to the disclosed embodiments, but, on the contrary, is intended to cover various modifications and equivalent arrangements included within the spirit and scope of the appended claims, and equivalents thereof.

What is claimed is:

1. A negative electrode for a rechargeable lithium battery, comprising:
    a current collector;
    a first negative active material layer on the current collector and comprising a first negative active material; and
    a second negative active material layer on the first negative active material layer and comprising a second negative active material,
    wherein the first negative active material layer and the second negative active material layer both have a peak intensity ratio ($I_{(002)}/I_{(110)}$) of a peak intensity at a (002) plane relative to a peak intensity at a (110) plane of 1 to 150 when measured by X-ray powder diffraction (XRD) using a CuKα ray,
    wherein an amount of the first negative active material in the first negative active material layer may be about 90 wt % to about 98 wt % based on the total weight of the first negative active material layer, and
    the first negative active material layer and the second negative active material layer are separate layers.

2. The negative electrode for a rechargeable lithium battery of claim 1, wherein the peak intensity ratio ($I_{(002)}/I_{(110)}$) is obtained after coating a composition for the first negative active material layer and a composition for the second negative active material layer on the current collector to prepare a first layer and a second layer, applying a magnetic field to the resulting product, and drying and compressing to prepare the first negative active material layer and the second negative active material layer.

3. The negative electrode for a rechargeable lithium battery of claim 1, wherein the peak intensity ratio ($I_{(002)}/I_{(110)}$) is obtained after coating a composition for the first negative active material layer on the current collector to form a first layer, coating a composition for the second negative active material layer on the first layer to form a second layer, applying a magnetic field to the resulting product, and drying and compressing to prepare the first negative active material layer and the second negative active material layer.

4. The negative electrode for a rechargeable lithium battery of claim 1, wherein the first negative active material layer and the second negative active material layer are oriented layers in which the first negative active material and the second negative active material are oriented with respect to the current collector.

5. The negative electrode for a rechargeable lithium battery of claim 1, wherein the peak intensity ratio ($I_{(002)}/I_{(110)}$) of the peak intensity at the (002) plane relative to the peak intensity at the (110) plane of the first negative active material layer and the second negative active material layer when measured by XRD using a CuKα ray, which may be correspond to about 90% or less of a peak intensity ratio ($I_{(002)}/I_{(110)}$) of non-oriented layers which have the same compositions and the thickness as the first negative active material layer and the second negative active material layer.

6. The negative electrode for a rechargeable lithium battery of claim 1, wherein a ratio of a peel strength of the first negative active material layer to that of the second negative active material layer is about 70% to about 90%.

7. The negative electrode for a rechargeable lithium battery of claim 1, wherein the first negative active material and the second negative active material are the same or different from each other, and are crystalline carbon-based materials.

8. The negative electrode for a rechargeable lithium battery of claim 7, wherein the crystalline carbon-based material is artificial graphite, natural graphite, or a combination thereof.

9. The negative electrode for a rechargeable lithium battery of claim 7, wherein the first negative active material and the second negative active material further comprises at least one selected from a Si-based negative active material, a Sn-based negative active material, and a lithium vanadium oxide negative active material.

10. The negative electrode for a rechargeable lithium battery of claim 1, wherein the first negative active material layer has a thickness of about 20 μm to about 125 μm, and the second negative active material layer has a thickness of about 20 μm to about 125 μm.

11. The negative electrode for a rechargeable lithium battery of claim 1, wherein the peak intensity ratio is a peak integral area value obtained from a peak integral area intensity value at the (002) plane/a peak integral area intensity value at the (110) plane.

12. A rechargeable lithium battery, comprising:
    a negative electrode of claim 1;
    a positive electrode; and
    an electrolyte.

* * * * *